Figure 1:
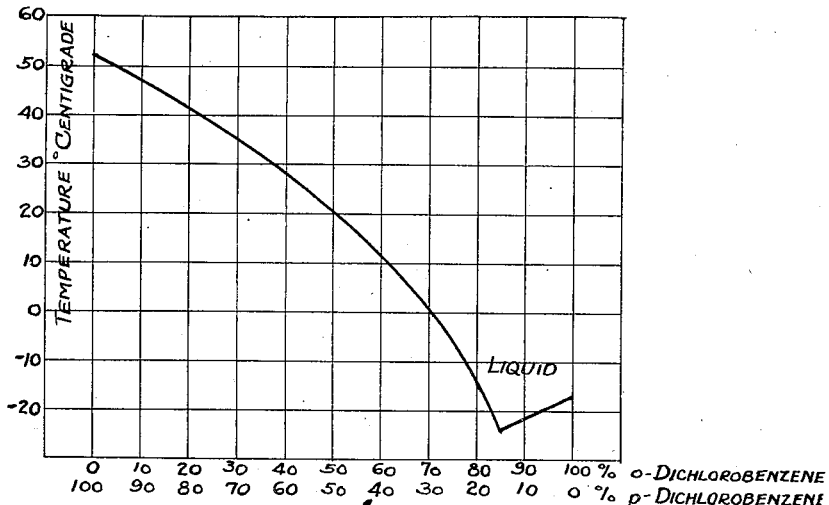

Patented Feb. 6, 1934

1,946,040

UNITED STATES PATENT OFFICE 1,946,040

CATALYST FOR THE NUCLEAR CHLORINATION OF BENZENE COMPOUNDS AND METHOD OF USING SAME

Wesley C. Stoesser and Frank B. Smith, Midland, Mich., assignors to The Dow Chemical Company, Midland, Mich., a corporation of Michigan Application October 1, 1931. Serial No. 566,228

12 Claims. (Cl. 260—161)

The present invention concerns a new catalyst for the nuclear chlorination of a benzene compound having the general formula,

wherein X represents hydrogen or a halo, alkyl or phenyl substituent, through treatment of said compound with free chlorine, in the presence of a mixed catalyst comprising sulphur and antimony trichloride, to form, primarily, the di-substituted benzene products. By employing our new catalyst in the above mentioned process, we are enabled to produce a relatively greater proportion of the para-di-substituted benzene along with a relatively smaller proportion of all other chlorination products than may be produced through similar treatment in the presence of either of the above mentioned catalysts individually.

It is general practice to chlorinate the nucleus of phenyl compounds with chlorine in the presence of a catalyst such as iron, ferric chloride, antimony trichloride, etc. The relative proportions of the para-di-substituted benzene product, with respect to all other chlorination products, may be varied through a change of solvent or catalyst employed or through a change in the temperature at which such operation is carried out. Through employment of that catalyst which favors the formation of maximum yields of the para-di-substituted product with respect to all other chlorination products and through use of the solvent and temperature found most favorable for the formation of the above mentioned product, optimum conditions for such chlorination process are attained. The kind and quantity of solvent and the temperature most favorable to the formation of the desired product, are conditions specific to the compound to be chlorinated, but readily determined in a given instance. The present invention more particularly concerns a new catalyst which, when used in the aforementioned chlorination process, gives rise to the formation of a larger proportion of the para-di-substituted product, with respect to all other products formed, than is known to be formed through similar use of any other catalyst.

We have found that when a benzene compound having the general formula,

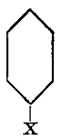

wherein X represents hydrogen or a halo, alkyl or phenyl substituent, is treated with chlorine in the presence of a mixed catalyst comprising sulphur and antimony trichloride, and under any given set of conditions with respect to the solvent and temperature employed, a relatively larger proportion of the para-chlorinated di-substituted benzene product is obtained, with respect to all other chlorination products, than may be formed through similar chlorination in the presence of either of the above mentioned catalysts alone, or, insofar as is known to us, through similar chlorination in the presence of any other catalyst or mixture of catalysts now known to the art. The present invention, then, consists in a new catalyst and the employment of the same in a process for chlorinating a benzene compound of the above mentioned class through treatment thereof with free chlorine, such new catalyst and improved method of chlorination being hereinafter fully described and particularly pointed out in the claims.

The annexed drawing and following description set forth the mode of procedure employed in making comparative chlorinations of benzene compounds belonging to the previously described class, both in the presence of a catalyst containing sulphur and antimony trichloride and in the presence of other catalysts.

Figure 2:
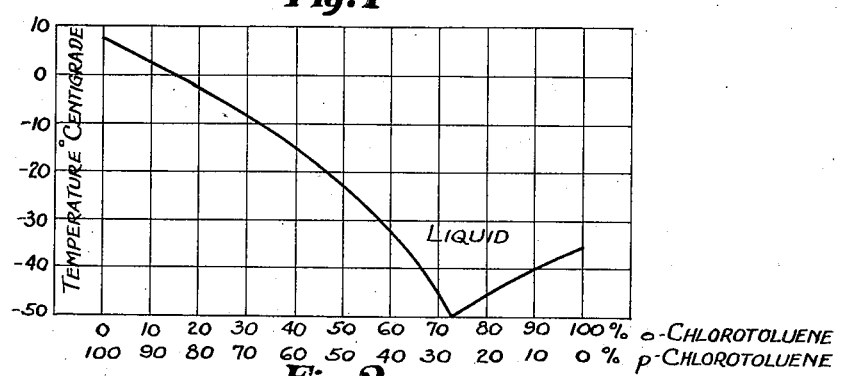
Figure 3:
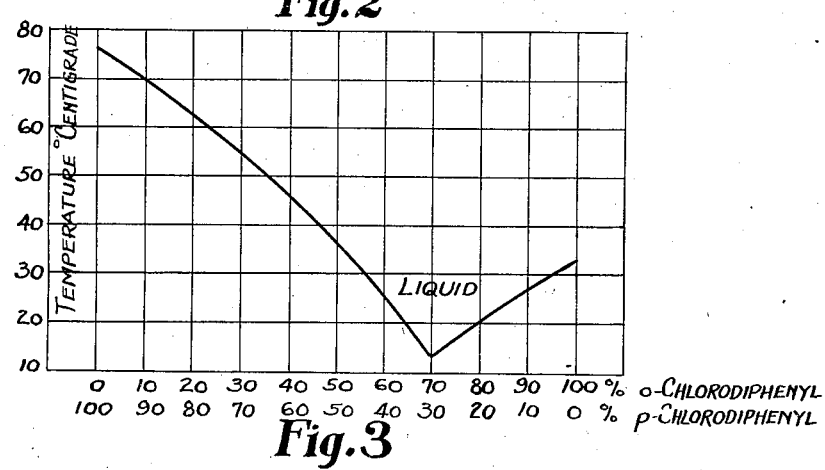

In said drawing, Fig. 1 represents the freezing point composition curve for mixtures of ortho- and para-dichloro-benzene, Fig. 2 represents a similar curve for a system consisting of ortho- and para-monochloro-toluene, and Fig. 3 represents a freezing point composition curve for the system, ortho- and para-monochloro-diphenyl.

Results obtained from such chlorination tests are listed in the table of examples which follows the general description. It is to be understood, however, that such descriptive matter and examples are illustrative of but several of the various ways in which the principle of our invention may be employed and are not to be construed as a limitation on the invention.

A measured quantity of catalyst and the substance to be chlorinated were placed in a three-necked flask fitted with a mechanical stirrer, a thermometer, an inlet for chlorine and an outlet for hydrogen chloride. A solvent was in some cases employed during chlorination. The mixture was stirred and chlorine slowly admitted to the same, the temperature being kept within a narrow range during such treatment. The amount of chlorination was determined through measurement both of the increase in weight of the reaction mixture and of the weight of hydrogen chloride evolved during said operation. When the desired degree of chlorination had been effected, air was blown through the reaction mixture to remove most of the hydrogen chloride. The mixture was next agitated with a slight excess of a 25 per cent sodium hydroxide solution over that required to neutralize the free acid present, and then filtered. The caustic alkaline layer was separated and the organic material fractionally distilled in order to separate the chlorine-containing di-substituted product from unreacted material and from other chlorination products. The percentage composition of the mixture of isomeric di-substituted benzene products was determined by comparing the freezing point of said mixture with the corresponding freezing point composition curve (given in the annexed drawing) in the usual way.

In the table given below is listed the ratio of the para-chlorinated di-substituted benzene product to all other di- and poly-substituted benzene products obtained through treatment of each of the compounds: diphenyl, toluene, monochloro-benzene, and benzene, with chlorine, both in the presence of a catalyst containing sulphur and antimony trichloride and in the presence of other catalysts. In each of the diphenyl runs, a solution, containing 770 grams of diphenyl dissolved in approximately 1500 grams of monochloro-benzene, was treated with chlorine under conditions described in the table. No solvents, other than the compounds themselves, were employed during the chlorination of toluene, monochloro-benzene, and benzene.

ing said benzene compound, and such yield is also higher than when any of the other catalysts mentioned are so employed. Iron, in runs 15, 21, and 26, and lead, in runs 16, 17, 22, and 23, have been added to the sulphur and antimony trichloride containing catalyst in order to determine the influence which the presence of such metals would exert upon the chlorination as carried out according to our improved method. The effect of iron was slight when used in the presence of our mixed catalyst. It was found, however, that a mixture of metallic lead with sulphur and antimony trichloride gave an outstanding result when employed as a catalyst in a chlorination process. When the clean fresh lead was first so used, along with the other compounds mentioned above, it appeared to depress slightly the preferential formation of para-chlorinated products. However, when the same sample of lead was so employed a second time (compare runs 17 and 23 with runs 16 and 22, respectively), the preferential formation of a para-chlorinated di-substituted benzene product was increased remarkably, so that the ratio of said para-chlorinated product to all other di- and poly-substituted benzene products was far higher than that obtainable through similar employment of any other known combination of catalysts. Iron apparatus, then, may well be employed in practicing the principle of our invention, but lead apparatus, or a catalyst com- Table 1

| Run no. | Temperature maintained during chlorination—°C. | Material chlorinated | Catalyst | Ratio of para-chlorinated di-substituted benzene to all other di- and poly-substituted benzene products recovered |
|---|---|---|---|---|
| 1 | 0–5 | Diphenyl | None | 0.782 |
| 2 | 20–25 | Diphenyl | 10 grams of Fe filings | 0.787 |
| 3 | 20–25 | Diphenyl | 3 grams of $PCl_5$ | 1.048 |
| 4 | 20–25 | Diphenyl | 2 grams of $AsCl_3$ | 1.008 |
| 5 | 20–30 | Diphenyl | 64 grams of previously used scrap lead | 1.031 |
| 6 | 0–5 | Diphenyl | 17.2 grams of S | 1.070 |
| 7 | 0–5 | Diphenyl | 5 grams of S | 0.983 |
| 8 | 20–25 | Diphenyl | 1 gram of S | 1.012 |
| 9 | 20–25 | Diphenyl | 1 gram of S+clean Fe scraps | 1.090 |
| 10 | 20–25 | Diphenyl | 2 grams of S+Fe scraps used in previous run | 1.012 |
| 11 | 20–25 | Diphenyl | 2 grams of S+clean Pb scraps | 1.053 |
| 12 | 20–25 | Diphenyl | 2 grams of $SbCl_3$ | 0.955 |
| 13 | 20–25 | Diphenyl | 5 grams of $SbCl_3$+2 grams of S | 1.182 |
| 14 | 20–25 | Diphenyl | 2 grams of $SbCl_3$+2 grams of S | 1.173 |
| 15 | 20–25 | Diphenyl | 5 grams of $SbCl_3$+2 grams of S+Fe scraps | 1,220 |
| 16 | 20–25 | Diphenyl | 2 grams of $SbCl_3$+2 grams of S+clean Pb scraps | 1.112 |
| 17 | 20–25 | Diphenyl | 5 grams of $SbCl_3$+2 grams of S+Pb scraps from previous run | 1.352 |
| 18 | 20–30 | 1,058 grams of toluene | 25 grams of Fe filings | 0.748 |
| 19 | 20–30 | 920 grams of toluene | 22.4 grams of Fe+4 grams of S | 0.618 |
| 20 | 20–25 | 920 grams of toluene | 10 grams of $SbCl_3$+4 grams of S | 0.961 |
| 21 | 20–30 | 916 grams of toluene | 24 grams of Fe+10 grams of $SbCl_3$+4 grams of S | 0.955 |
| 22 | 20–30 | 920 grams of toluene | 10 grams of $SbCl_3$+4 grams of S+62 grams of clean Pb scraps | 0.827 |
| 23 | 20–25 | 920 grams of toluene | 10 grams of $SbCl_3$+4 grams of S+62 grams of Pb scraps from previous run | 1.109 |
| 24 | 30–40 | 1,200 grams of monochloro-benzene | 50 grams of Fe filings | 1.355 |
| 25 | 20–30 | 1,200 grams of monochloro-benzene | 10 grams of $SbCl_3$+5 grams of S | 3.071 |
| 26 | 20–50 | 1,125 grams of monochloro-benzene | 22.5 grams of Fe+10 grams of $SbCl^3$+5 grams of S | 2.955 |
| 27 | 20–26 | 2,500 grams of benzene | 75 grams of Fe turnings | 2.195 |
| 28 | 20–25 | 2,010 grams of benzene | 5 grams of $SbCl_3$+2 grams of S | 4.750 |

It will be noted that in those instances (runs 13, 14, 15, 16, 17, 20, 21, 22, 23, 25, 26, and 28) where a catalyst containing sulphur and antimony trichloride is employed during the chlorination of a particular benzene compound, the yield of para-chlorinated product, with respect to all other di- or poly-substituted benzene products, is higher than when either of the above mentioned catalysts is used individually in chlorinatprising metallic lead, antimony trichloride, and sulphur, may be so employed with actual advantage.

Our improved process may be operated in ways other than those previously described. For instance, although monochloro-benzene is the only solvent specifically mentioned in the description and examples given above, other solvents, e. g. carbon tetrachloride, benzene, etc., may be used to dissolve the substance to be chlorinated. Again, our process may be successfully operated at temperatures other than those described in the examples, the range of temperature being substantially the same as that within which similar chlorinations, using other catalysts, may be performed. Our invention constitutes an improvement over previously known processes for using free chlorine to chlorinate compounds of the class mentioned, regardless of the temperature at which comparative chlorinations are made.

Other modes of applying the principle of our invention may be employed instead of those explained, change being made as regards the process herein disclosed, provided the means stated by any of the following claims or the equivalent of such stated means be employed.

We therefore particularly point out and distinctly claim as our invention:—

1. A chorlination catalyst for the nuclear chlorination of a benzene compound having the general formula,

where X represents hydrogen or a halo, alkyl or phenyl substituent, through treatment thereof with free chlorine, such chlorination catalyst comprising a mixture of sulphur and antimony trichloride.

2. As a catalyst in a method for the nuclear chlorination of a benzene compound having the general formula,

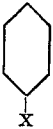

wherein X represents hydrogen or a halo, alkyl or phenyl substituent, through treatment thereof with free chlorine to form the para-di-substituted benzene product, a mixture consisting of sulphur and antimony trichloride.

3. As a catalyst in a method for the nuclear chlorination of a benzene compound having the general formula,

wherein X represents hydrogen or a halo, alkyl or phenyl substituent, through treatment thereof with free chlorine to form the para-di-substituted benzene product, a mixture consisting of sulphur, antimony trichloride and iron.

4. As a catalyst in a method for the nuclear chlorination of a benzene compound having the general formula,

wherein X represents hydrogen or a halo, alkyl or phenyl substituent, through treatment thereof with free chlorine to form the para-di-substituted benzene product, a chlorination catalyst mixture comprising sulphur, antimony trichloride and lead.

5. As a catalyst, in a method for the nuclear chlorination of a benzene compound having the general formula,

wherein X represents hydrogen or a halo, alkyl, or phenyl substituent, through treatment thereof with free chlorine to form the para-di-substituted benzene product, a mixture consisting of sulphur, antimony trichloride and lead.

6. As a catalyst in a method for the nuclear chlorination of a benzene compound having the general formula,

wherein X represents hydrogen or a halo, alkyl or phenyl substituent, through treatment thereof with free chlorine to form the para-di-substituted benzene product, a chlorination catalyst mixture comprising sulphur, antimony trichloride and chlorine-treated lead.

7. In a method for the nuclear chlorination of a benzene compound having the general formula,

wherein X represents hydrogen or a halo, alkyl or phenyl substituent, the step which consists in treating such compound with free chlorine in the presence of a chlorination catalyst comprising a mixture of sulphur, antimony trichloride and lead.

8. In a method for the nuclear chlorination of a benzene compound having the general formula,

wherein X represents hydrogen or a halo, alkyl or phenyl substituent, the step which consists in treating such compound with free chlorine in the presence of a chlorination catalyst comprising a mixture of sulphur, antimony trichloride and chlorine-treated lead.

9. In a method for the nuclear chlorination of a benzene compound having the general formula,

wherein X represents hydrogen or a halo, alkyl or phenyl substituent, the step which consists in treating such compound with free chlorine in the presence of a chlorination catalyst comprising a mixture of sulphur and antimony trichloride.

10. In a method for the nuclear chlorination of benzene, the step which consists in treating said compound with free chlorine in the presence of a chlorination catalyst comprising a mixture of sulphur and antimony trichloride.

11. In a method for the nuclear chlorination of monochloro-benzene, the step which consists in treating said compound with free chlorine in the presence of a chlorination catalyst comprising a mixture of sulphur and antimony trichloride.

12. In a process for the nuclear chlorination of diphenyl, the step which consists in treating said compound with free chlorine in the presence of a chlorination catalyst comprising a mixture of sulphur and antimony trichloride.

WESLEY C. STOESSER.
FRANK B. SMITH.